(12) United States Patent
Wang et al.

(10) Patent No.: US 8,428,339 B2
(45) Date of Patent: Apr. 23, 2013

(54) SYSTEM AND METHOD FOR ALIGNMENT AND INSPECTION OF BALL GRID ARRAY DEVICES

(75) Inventors: Xiaoguang Wang, Alpharetta, GA (US); Lei Wang, Shrewsbury, MA (US)

(73) Assignee: Cognex Corporation, Natick, MA (US)

( * ) Notice: Subject to any disclaimer, the term of this patent is extended or adjusted under 35 U.S.C. 154(b) by 721 days.

(21) Appl. No.: 12/612,793

(22) Filed: Nov. 5, 2009

(65) Prior Publication Data
US 2011/0103678 A1    May 5, 2011

(51) Int. Cl.
*G06K 9/00* (2006.01)

(52) U.S. Cl.
USPC ........................................................ 382/150

(58) Field of Classification Search .................. 382/150, 382/155
See application file for complete search history.

(56) References Cited

U.S. PATENT DOCUMENTS

| | | | | |
|---|---|---|---|---|
| 5,446,960 A * | 9/1995 | Isaacs et al. | ..................... | 29/834 |
| 5,710,063 A * | 1/1998 | Forehand et al. | ............ | 438/106 |
| 5,796,590 A * | 8/1998 | Klein | ............................. | 361/774 |
| 5,978,502 A * | 11/1999 | Ohashi | .......................... | 382/147 |
| 5,983,477 A * | 11/1999 | Jacks et al. | .................... | 29/407.1 |
| 6,151,406 A * | 11/2000 | Chang et al. | ................... | 382/147 |
| 6,177,682 B1 * | 1/2001 | Bartulovic et al. | ...... | 250/559.44 |
| 6,963,143 B2 * | 11/2005 | Howarth | ....................... | 257/797 |
| 7,005,754 B2 * | 2/2006 | Howarth | ....................... | 257/797 |
| 7,117,469 B1 | 10/2006 | Dahl | | |
| 7,139,421 B1 | 11/2006 | Fix et al. | | |
| 7,340,076 B2 * | 3/2008 | Stach et al. | ................... | 382/100 |
| 2002/0100955 A1 | 8/2002 | Potter | | |
| 2003/0094707 A1 * | 5/2003 | Howarth | ....................... | 257/797 |
| 2004/0120571 A1 * | 6/2004 | Duvdevani et al. | ........... | 382/149 |

OTHER PUBLICATIONS

Wu, Wen-Yen et al., A System for Automated BGA Inspection, Proceedings of the 2004 IEEE Conference on Cybernetics and Intelligent Systems, Singapore, Dec. 1-3, 2004.
PCT Search Report US/2010/002895, dated Apr. 12, 2011.

* cited by examiner

*Primary Examiner* — Roy M Punnoose
(74) *Attorney, Agent, or Firm* — Quarles & Brady LLP

(57) ABSTRACT

A system and method for high-speed alignment and inspection of components, such as BGA devices, having non-uniform features is provided. During training time of a machine vision system, a small subset of alignment significant blobs along with a quantum of geometric analysis for picking granularity is determined. Also, during training time, balls may be associated with groups, each of which may have its own set of parameters for inspection.

17 Claims, 11 Drawing Sheets

SYSTEM AND METHOD FOR ALIGNMENT
AND INSPECTION OF BALL GRID ARRAY
DEVICES

FIELD OF THE INVENTION

The present invention relates to machine vision systems and, more specifically, to aligning and inspecting components having a plurality of non-uniform features using a machine vision system.

BACKGROUND OF THE INVENTION

The use of advanced machine vision systems and their underlying software is increasingly employed in a variety of manufacturing and quality control processes. Machine vision enables quicker, more accurate and repeatable results with fewer errors to be obtained in the production of both mass-produced and custom products. Basic machine vision systems include one or more cameras (typically having solid-state charge couple device (CCD) imaging elements) directed at an area of interest, frame grabber/image processing elements that capture and transmit CCD images, a computer and display for running the machine vision software application and manipulating the captured images, and appropriate illumination on the area of interest.

Many applications of machine vision involve the inspection of components and surfaces for defects that affect quality. Where sufficiently serious defects are noted, a part of a surface is marked as unacceptable/defective. Machine vision has also been employed in varying degrees to assist in manipulating manufacturing engines in the performance of specific tasks. Specifically, machine vision systems may be utilized for inspection of components along an assembly line to ensure that the components meet a predefined criteria before insertion and/or assembling of the components into a finished product. Machine vision systems may also be utilized for locating both those components and the product being assembled so that the insertion and/or assembly equipment can assemble the finished product automatically without human intervention.

Machine vision systems are typically utilized in alignment and inspection of devices having a ball grid array (BGA) form factor. BGA devices typically include a plurality of small solder balls on a mounting side of the device. The solder balls may then be soldered using ultrasound and/or infrared technology once a device is appropriately placed on a circuit board. The number of solder balls on BGA devices have dramatically increased so that current BGA devices may have on the order of thousands of balls. Furthermore, modern BGA devices typically have the solder balls less aligned on a grid pattern, i.e., the solder balls are non-uniformly spaced on the component. Additionally, BGA devices may now utilize non-uniformly sized and/or non-circular solder balls/solder points, e.g., solder balls of varying sizes and/or shapes.

These trends complicate current machine vision systems that are utilized for the alignment and/or inspection of BGA devices. As the number of balls grows very large, current methods that rely on extracting balls or otherwise measuring ball features typically execute at a speed that is unacceptably slow for run time. Furthermore, as the patterns of balls become more complex, search-based approach to alignments may enter worst-case scenarios. This may occur because a small misalignment in the translational degree of freedom or the rotation angle may mean that a majority of individual features match thereby increasing the probability of an incorrect match occurring.

Additionally, prior art machine vision systems are typically incapable of performing alignment and/or inspection when balls are not uniform in size and/or shape. The combination of increasing number of balls, varying size and/or shape and the non-uniform spacing of balls prevents current machine vision implementations from effectively aligning and/or inspecting BGA devices at a commercially acceptable rate of speed and efficiency.

SUMMARY OF THE INVENTION

The present invention overcomes the disadvantages of the prior art by providing a system and method for high-speed alignment and/or inspection of components, e.g., BGA devices, having a plurality of non-uniform features. Illustratively, the non-uniform features may comprise solder balls varying sizes and/or shapes, arranged in varying (or lack of) grid patterns, etc. Generally, the illustrative machine vision system is first trained regarding alignment and inspection of the features of the BGA device. Later, during run time, the BGA device is first aligned and then inspected in accordance with an illustrative embodiment of the present invention.

In accordance with an illustrative embodiment of the present invention, during training time of a machine vision system, a small subset of alignment significant blobs along with a quantum of geometric analysis for picking granularity is determined. The alignment significant blobs may be determined either by extraction, using, e.g., edge detection, from an image of a device or by analyzing a geometric model of the device. The extraction, either by edge detection of an image or by geometric model analysis, results in one or more grayscale blobs. Alignment significant blobs are then determined from the grayscale blobs. Once alignment significant blobs are determined, parameters for runtime smoothing and down-sampling are then determined on the alignment significant blobs and an alignment mask is generated. Illustratively, the alignment mask may accommodate varying sized blobs and may also accommodate non-circular blobs, i.e., blobs having varying shapes.

Also during training time of a machine vision inspection system, a geometric model of the device is entered and analyzed to identify one or more candidate solder ball groups. Each candidate solder ball group is illustratively formed by a set of solder balls having the same size, shape and grid alignment. The candidate groups are illustratively displayed to a user who may then modify the groups. Illustratively, a user may utilize a graphical user interface (GUI) to modify the members of a candidate solder ball group. Once each group boundary is set, the user may set parameters for each group including, for example, various pass/fail thresholds for inspection items associated with the balls within the group.

In operation during runtime, an image is captured of the device which is then smoothed and down sampled using the previously defined values. A coarse alignment is then performed before performing a fine alignment. The coarse and fine alignments only utilize previously identified alignment significant blobs, thereby providing higher speed and accuracy of alignment of the device. The alignment information is then utilized by the inspection components of the machine vision system. Each ball is extracted from the image and, for each ball, an inspection is performed utilizing the appropriate parameters set for the group in which the ball is a member. Once all balls have been examined, results of the inspection are then output. The results may be utilized by, e.g., industrial automation equipment can be used to make determinations whether to utilize a given device, etc.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Machine Vision System

Figure 1:
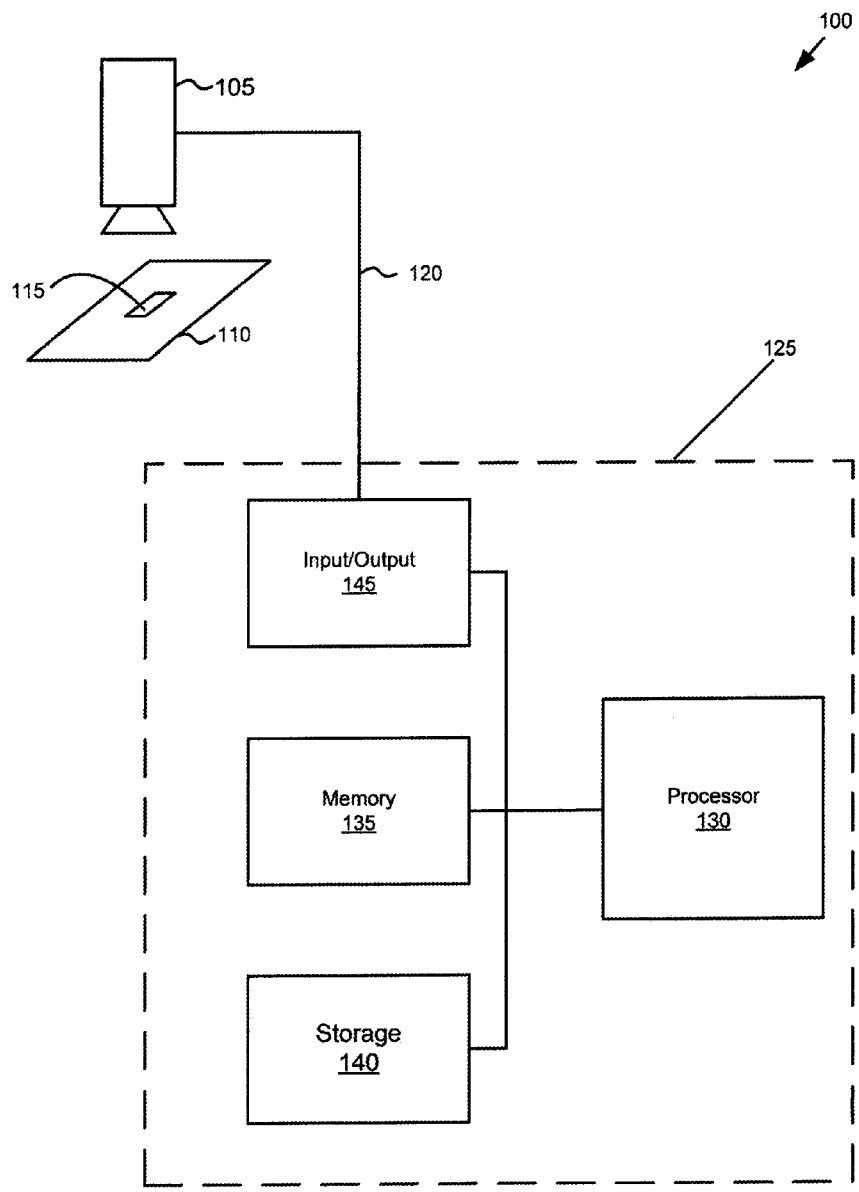
FIG. 1 is a schematic block diagram of an exemplary machine vision system in accordance with an illustrative embodiment of the present invention.

FIG. 1 is a schematic block diagram of a machine vision system 100 that may be utilized to practice the principles of the present invention in accordance with an illustrative embodiment of the present invention. The machine vision system 100 includes a capturing device 105 that generates an image of a field of view 110 that includes one or more objects 115, such as a BGA device or other component. The capturing device 105 may comprise a conventional video camera or scanner. Such a video camera may be a charge coupled device (CCD) or other system for obtaining appropriate image information, such as the well-known CMOS sensors. Image data (or pixels) generated by the capturing device 105 represents an image intensity, for example, color or brightness of each point in the scene within the resolution of the capturing device 105. The capturing device 105 transmits a digital image data via a communications path 120 to an image analysis system 125. The image analysis system 125 may comprise a conventional digital data processor, such as the vision processing systems of the type commercially available from, for example, Cognex Corporation. The image analysis system 125 may comprise a conventional microcomputer or other exemplary computing device. Other forms of interfaces may be utilized, including, e.g., personal digital assistants (PDAs), etc. In alternative embodiments, the capturing device may include processing capabilities to perform the functions of the image analysis system. In such embodiments, there is not a need for a separate image analysis system. In further alternative embodiments, a capturing device may be operatively interconnected with an image analysis system for training purposes. Once training has occurred, an appropriate model or models may be stored in the capturing device for use during run time.

The image analysis system 125 is illustratively programmed in accordance with the teachings of the present invention and provides for high speed alignment and inspection of components in accordance with an illustrative embodiment of the present invention. The image analysis system 125 may have one or more central processing units (processors) 130, main memory 135, input/output systems 145 and one or more disk drives or other form of mass storage 140. Illustratively, the input/output system 145 interconnects with the communications path 120 between the capturing device 105 and the image analysis system 125. The system 125 may be configured by programming instructions in accordance with the teachings of the present invention. As will be appreciated by those skilled in the art, alternative hardware and/or software configurations may be utilized to implement the principles of the present invention. Specifically, the teachings of the present invention may be implemented in software, hardware, firmware and/or any combination thereof. Furthermore, during run-time, as opposed to training time, additional and/or differing components may be included in the machine vision system 100. For example, objects 115 may be transported by a conveyor belt (not shown) or other assembly line apparatus, etc.

It should be noted that while the present invention is described in terms of a machine vision system 100, the principles of the present invention may be utilized in a variety of differing embodiments. As such, the term machine vision system should be taken to include alternative systems. More generally, the principles of the present invention may be implemented on any system that aligns and/or inspects components. For example, one embodiment may involve a conventional machine vision system comprising of a stand alone camera operatively interconnected with a stand alone computer programmed to process images, etc.

However, the principles of the present invention may be utilized in other devices and/or systems that align and/or inspect components based on images acquired of the component. For example, a vision sensor, such as the Checker product available from Cognex Corporation, or other device that comprises illumination sources, image acquisition capabilities and/or processing capabilities. Such vision sensors may be trained and/or configured via separate modules, such as a Cognex VisionView. In such embodiments, the user may train the vision sensor using a plurality of objects, instead of a single object. The user may select a first object, place it in front of the sensor and indicate to the system that the training object is positioned. A second (third, etc.) object may be similarly trained. The user may control the training step using, e.g., a graphical user interface (GUI) and/or buttons or other control surfaces located on either the training module and/or the vision sensor itself. Furthermore, the functionality of the present invention may be incorporated into handheld devices, wireless compatible devices, etc. It should be noted that the alignment and inspection functions may be divided among various hardware and/or software modules in alternative embodiments. As such, the term machine vision system should be interpreted broadly to encompass all such systems and devices that may utilize one or more of the teachings of the present invention.

B. BGA Devices Having Non-Uniform Features

Figure 2:
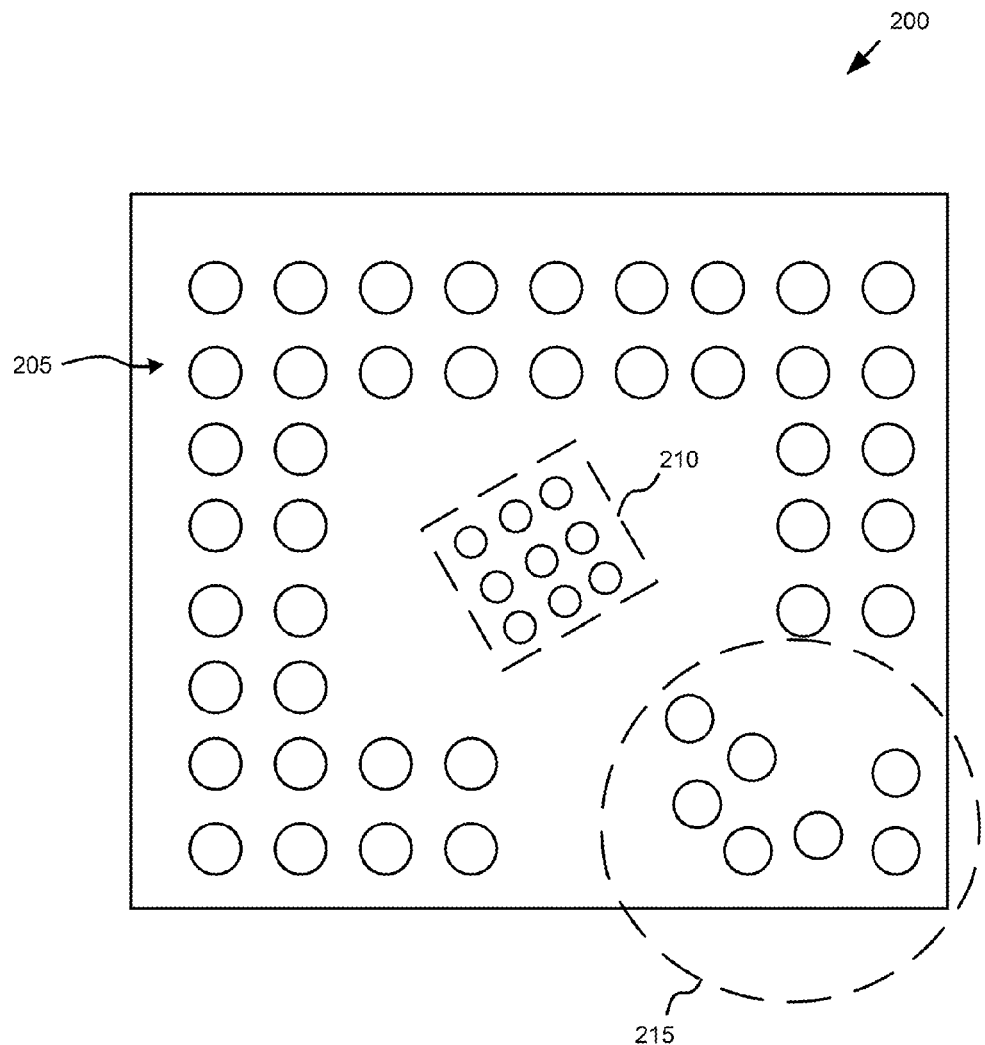
FIG. 2 is a schematic block diagram of a portion of a solder ball pattern of an exemplary device in accordance with an illustrative embodiment of the present invention.

FIG. 2 is a schematic block diagram of a portion of a solder ball pattern of an exemplary BGA device 200 in accordance with an illustrative embodiment of the present invention. It should be noted that in illustrative embodiments of the present invention, a BGA device may have thousands of balls. Thus, the schematic diagram of the BGA device 200 should be taken as exemplary only. It should further be noted that on exemplary device 200, a number of the solder balls are laid out in various grid patterns. However, it is expressly contemplated that in alternative embodiments of the present invention, all of the balls may be laid out in a non-grid or other non-uniform pattern. As such, the description of device 200 should not be taken to limit the invention to having at least some grid-aligned ball patterns.

In illustrative embodiments of the present invention, the size, shape, and/or orientation of regions of balls on a device may vary dramatically. Exemplary BGA device 200 includes three distinct regions. A first region 205 comprises of a set of balls aligned on a grid pattern with the solder balls having an equal first diameter. Illustratively, each solder ball within region 205 is of an equal first size. A second region 210 comprises of another set of the grid aligned solder balls; however, the solder balls in the second region 210 are of a different size (i.e., not equal to the first diameter) than those of the first region 205. A third region 215 comprises a plurality of balls that are not grid aligned. It should be noted that in alternative embodiments of the present invention, solder ball shape may also vary, that is balls may have non-circular shapes. As such, the description of exemplary device 200 having circular balls should be taken as exemplary only.

As it will be appreciated by one skilled in the art, the principles of the present invention may be utilized in BGA devices having any number of regions of balls having non-uniform features including, for example, grid aligned or non-aligned, ball size and/or ball shape. As such, the description of device 200 should be taken as exemplary BGA device for the purposes of illustrating the principles of the present invention. The principles of the present invention may be generalized to the alignment and/or inspection of any components having non-uniform features.

C. Alignment Training

Figure 3A:
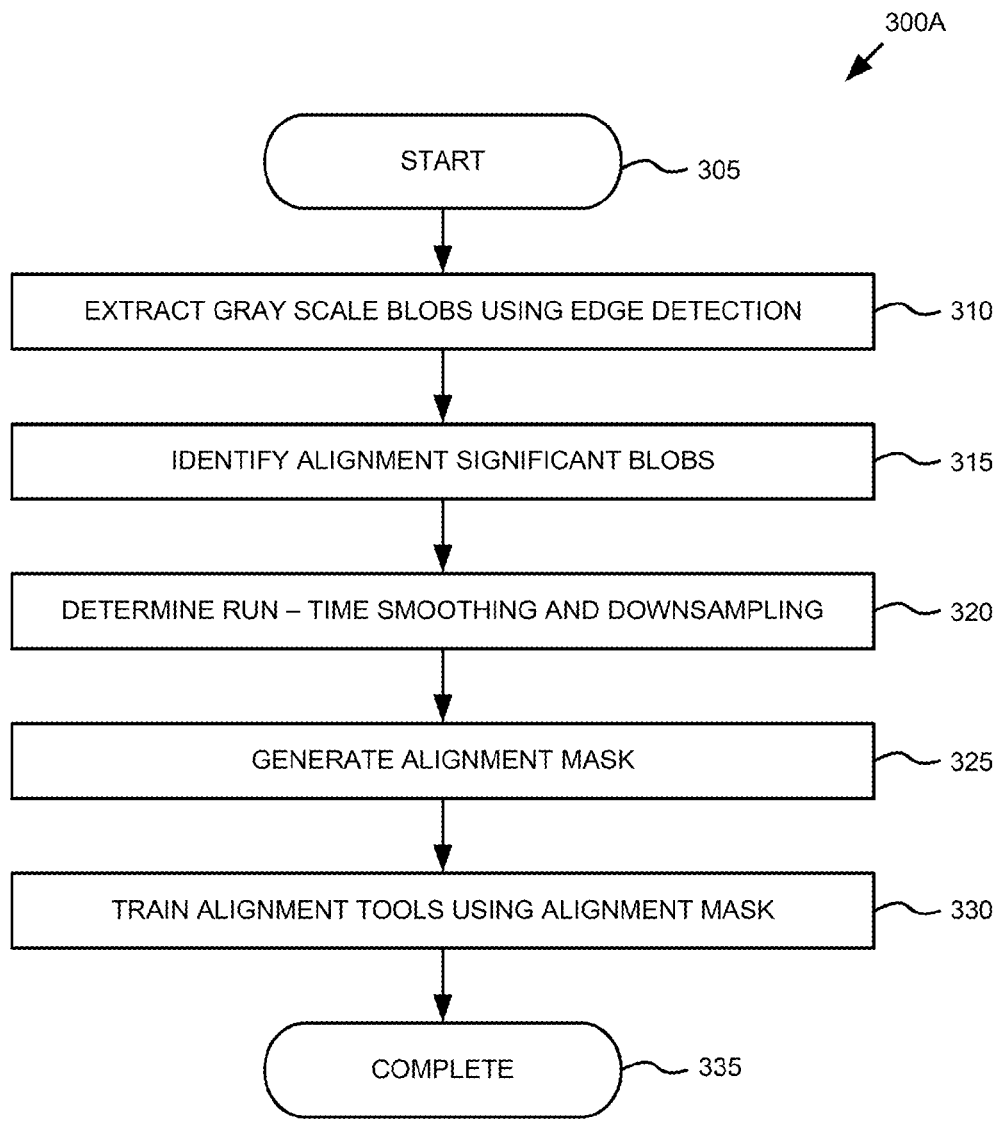
FIG. 3A is a flow chart detailing the steps of a procedure for training a machine vision system utilizing image capture in accordance with an illustrative embodiment of the present invention.

FIG. 3A is a flow chart detailing the steps of a procedure 300A for training a machine vision system utilizing image capture of a device in accordance with an illustrative embodiment of the present invention. The procedure 300A begins in step 305 and continues to step 310 where grayscale blobs are extracted from an image using edge detection. Illustratively, a blob tool that utilizes gray-level intensity based image segmentation, such as the Cognex blob tool available from Cognex Corporation of Natick, Mass. is used to identify these objects in the image. The boundary of the found blob is then used to create a polygonal representation of the ball. This polygonal representation may be later utilized in creating the alignment mask in step 325, described further below. In alternative embodiments, when the targets are limited to known shapes (e.g., circular balls), a Sobel edge extraction technique may be utilized to perform to find the edge chains in the image. Illustratively, a closed edge chain, or a set of open edge change with small gaps, may be fitted to the known shape which is in utilized as a model.

Once grayscale blobs have been extracted, the machine vision system then identifies alignment significant blobs in step 315. Alignment significant blobs are those blobs that cannot be easily mistaken for their neighbors when a pattern is shifted in various directions. More generally, blobs that are on boundaries of dense regions are typically alignment significant. One technique for determining alignment significance is described below. However, it should be noted that alternative techniques for determining alignment significance may be utilized in alternative embodiments of the present invention. As such, the alignment significance determination technique described herein should be taken as exemplary only.

For the purposes of an illustrative embodiment of an alignment significance determination, an immediate neighbor of a blob is defined to be those neighbors within a predefined constant factor of a given blob's nearest neighbor distance. In an illustrative embodiment, the predefined constant factor is 1.5. Thus, those blobs within 1.5 units of a given blob's nearest neighbor are defined to be the blob's immediate neighbors. A blob is then defined as alignment significant if a sufficiently large angle exists in which there are no immediate neighbors.

Figure 5:
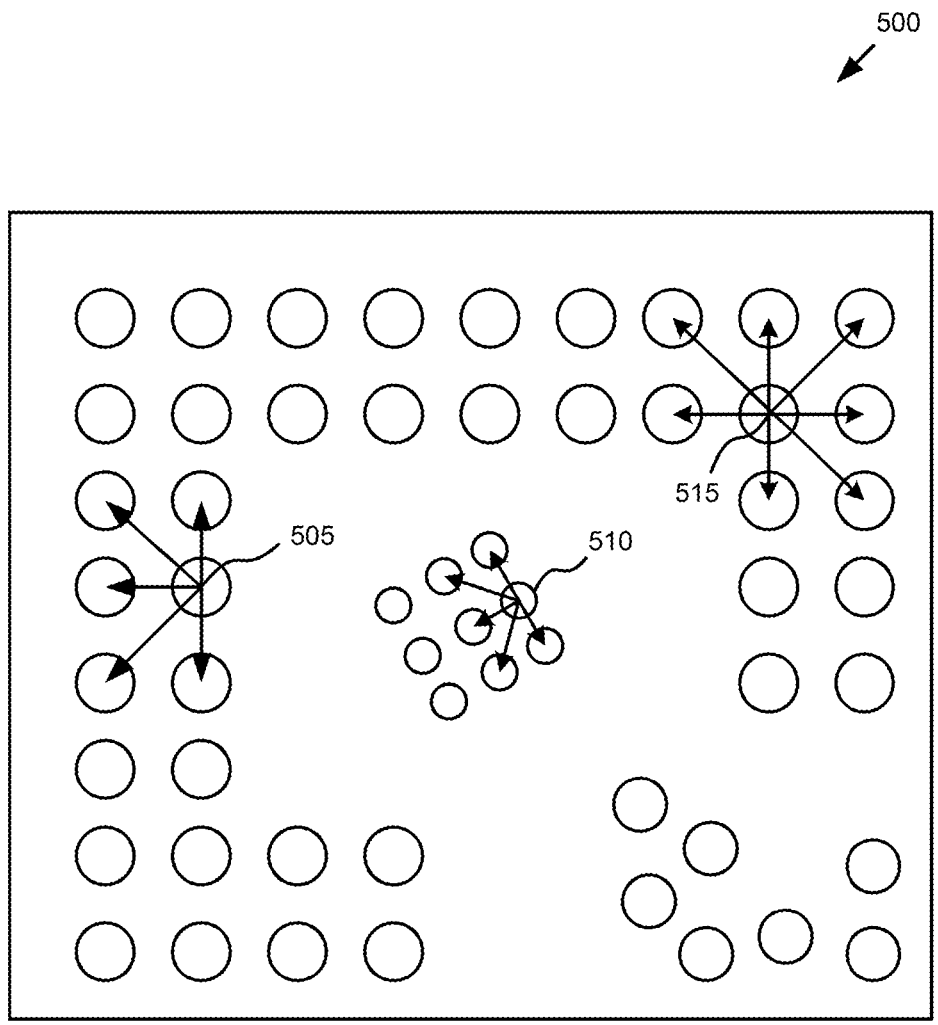
FIG. 5 is a schematic block diagram of a portion of a solder ball pattern of an exemplary component showing determinations of alignment significant blobs in accordance with an illustrative embodiment of the present invention.

FIG. 5 is a schematic block diagram of an exemplary BGA device 500 in accordance with an illustrative embodiment of the present invention. Illustratively, device 500 contains the same pattern of balls as illustrated for exemplary device 200 shown and described above in relation to FIG. 2. Illustratively, FIG. 5 shows a subset of a larger image that may contain, e.g., thousands of solder balls. As such, it should be assumed that the outer row of solder balls extends beyond the image of FIG. 5. In an illustrative embodiment, a predefined angle of 135° is utilized to determine alignment significance. However, in alternative embodiments, any angle may be utilized as a threshold angle for determining alignment significance. As such, the description of the use of 135° angle should be taken as exemplary only.

Thus, in accordance with step 315 of procedure 300, each blob in illustrative is device 500 is examined for alignment significance. Exemplary blob 505 is examined and it is determined the angle in which there are no neighbors is approximately 180°. As this is greater than the exemplary 135° threshold, blob 505 is deemed to be alignment significant. Similarly, blob 510 is also examined and is determined that the angle at which there are no neighbors is 180°. Similar to blob 505, as this is greater than the 135° threshold, blob 510 is deemed to be alignment significant. Blob 515 is examined and it is determined that the largest angle with no immediate neighbors is approximately 90°. As 90° is less than the 135° threshold, blob 515 is deemed to not be alignment significant.

This significance determination is illustratively made for each of the solder balls on device 500.

Figure 6:
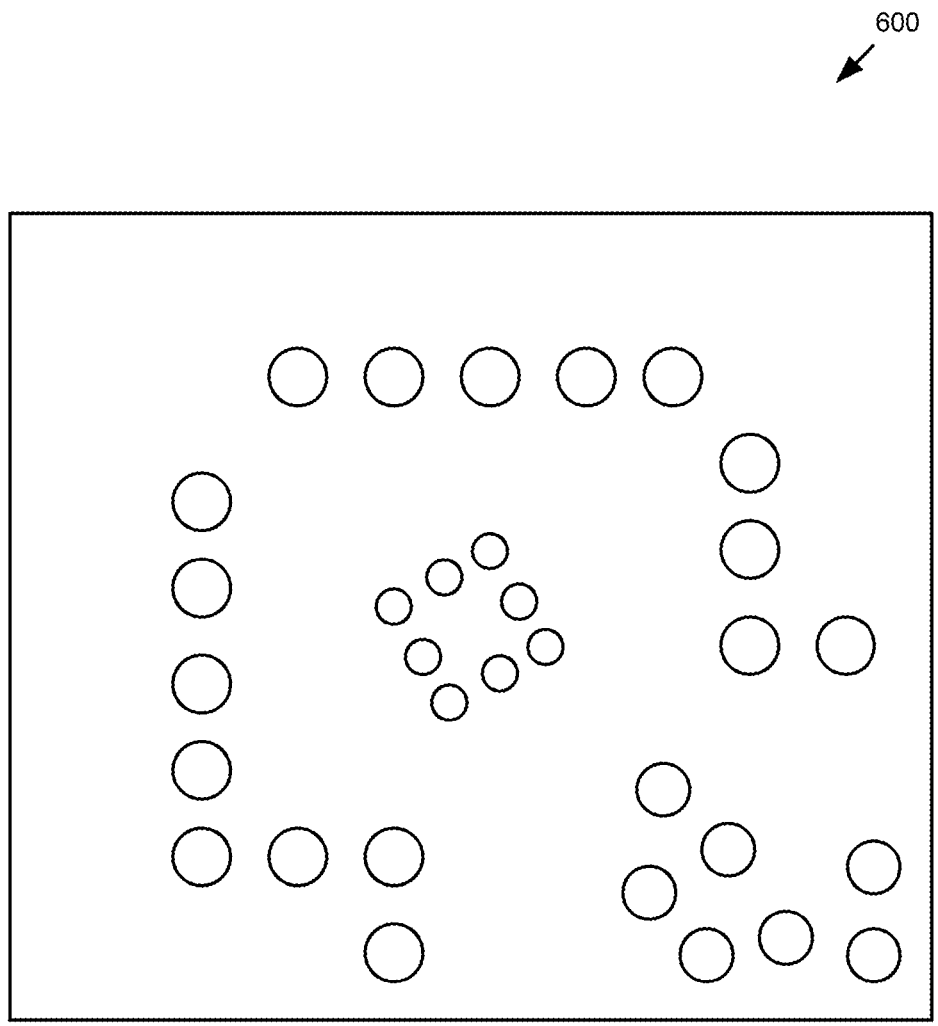
FIG. 6 is a schematic block diagram of a portion of a solder ball pattern of an exemplary component showing alignment significant blobs in accordance with an illustrative embodiment of the present invention.

FIG. 6 is a schematic diagram illustrating the alignment significant blobs from device 600. Illustratively, only those blobs from device 500 of FIG. 5 that meet the 135° threshold level are shown in FIG. 6. As noted above, the image of FIG. 5 is assumed to extend outward. As such, the outermost row of solder balls shown in FIG. 5 is assumed to have another row beyond (not shown), thereby resulting in the outermost row not being alignment significant. It should be noted that in alternative embodiments, differing thresholds will cause differing alignment significance determinations to be made. As such, FIG. 6 should be viewed as exemplary only. Returning to procedure 300A, in step 320, the machine vision system determines appropriate run time smoothing and down sampling for the image. Smoothing is performed to enable search methods to be robust by ensuring that a reasonable match score is attained.

Figure 4A:
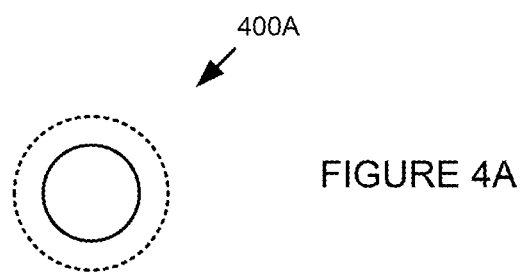
FIG. 4A is a schematic diagram of an exemplary alignment mask of a circular ball in accordance with an illustrative embodiment of the present invention.
Figure 4B:
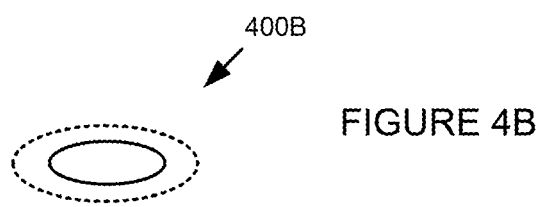
FIG. 4B is a schematic diagram of an exemplary alignment mask of an oval ball in accordance with an illustrative embodiment of the present invention.
Figure 4C:
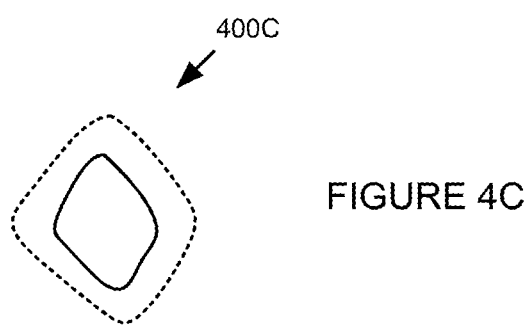
FIG. 4C is a schematic diagram of an exemplary alignment mask of a non-circular ball in accordance with an illustrative embodiment of the present invention.

In step 325, an alignment mask is generated that only includes those alignment significant blobs. Illustratively, a plurality of alignment masks may be generated with differing masks being specific to certain alignment tools and/or techniques. FIG. 4A is a schematic diagram of an exemplary alignment mask of a circular ball in accordance with an illustrative embodiment of the present invention. FIG. 4B is a schematic diagram of an exemplary alignment mask of an oval ball in accordance with an illustrative embodiment of the present invention. FIG. 4C is a schematic diagram of an exemplary alignment mask of a non-circular ball in accordance with an illustrative embodiment of the present invention. Once the alignment mask is generated, the generated mask is utilized to train one or more alignment tools in step 330. Such alignment tools may include, e.g., normalized correlation tools, edgelet based tools, etc.

The procedure 300A then completes in step 335. Illustratively, procedure 300A works to train a machine vision system by focusing only on alignment significant regions of a component. This reduces the complexity and increases the speed at which components can be aligned during run time.

Figure 3B:
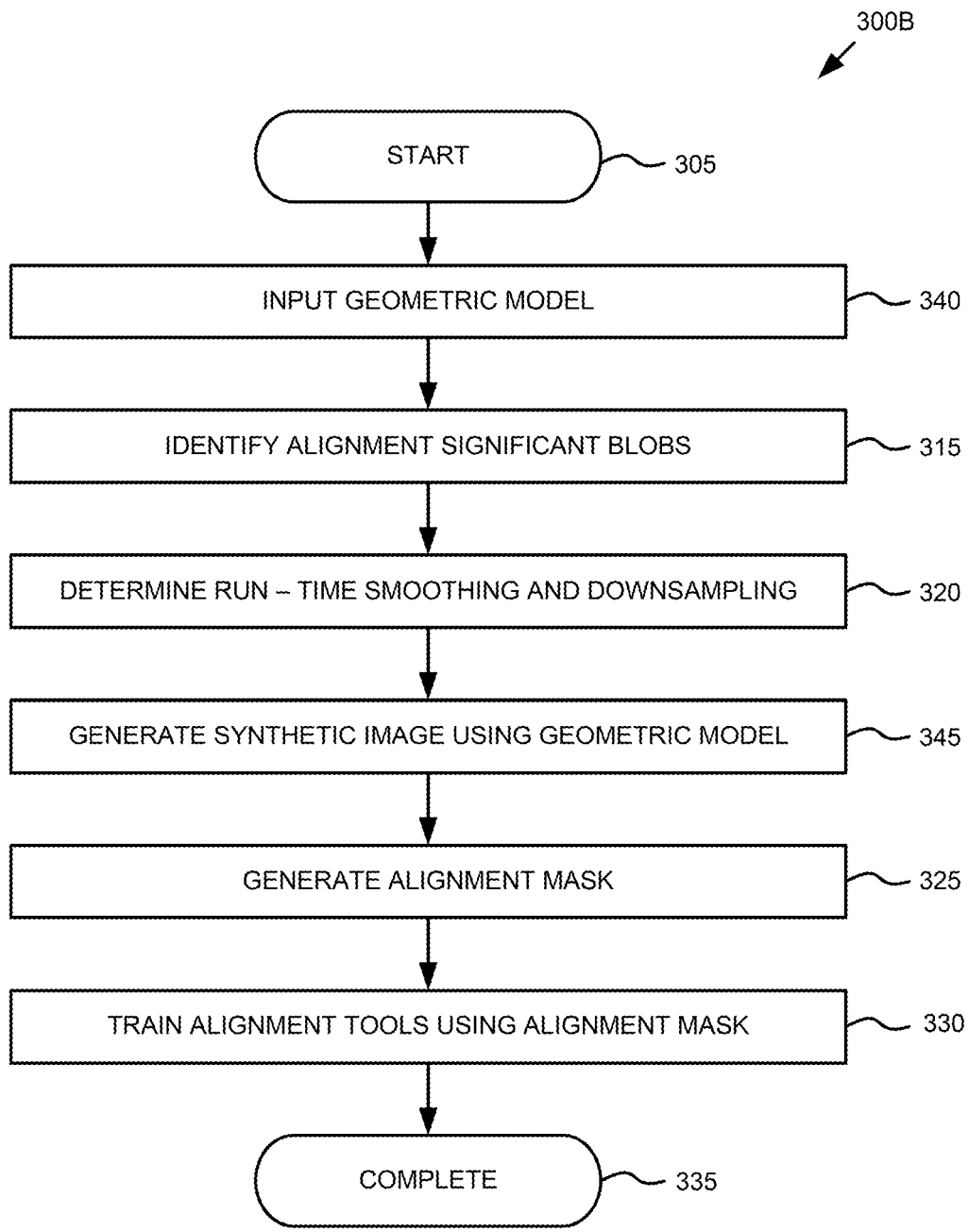
FIG. 3B is a flow chart detailing the steps of a procedure for training a machine vision system utilizing a geometric model in accordance with an illustrative embodiment of the present invention.

FIG. 3B is a flow chart detailing the steps of a procedure 300B for performing training of a machine vision system in accordance with an illustrative embodiment of the present invention. The procedure 300B begins in step 305 and continues to step 340 where a geometric model is input into the machine vision system. Illustratively, the geometric model may comprise, e.g., a computer aided design (CAD) model of the BGA device to be inspected. The machine vision system then, in step 315 identifies alignment significant blobs from the geometric model. Parameters for run-time smoothing and downsampling is then determined in step 320. A synthetic image is then generated using the geometric model in step 345. An alignment mask is then generated in step 325. The alignment tools are then trained using the generated alignment mask and the synthetic image in step 330. The procedure 300B then completes in step 335.

D. Solder Ball Groups

Figure 7:
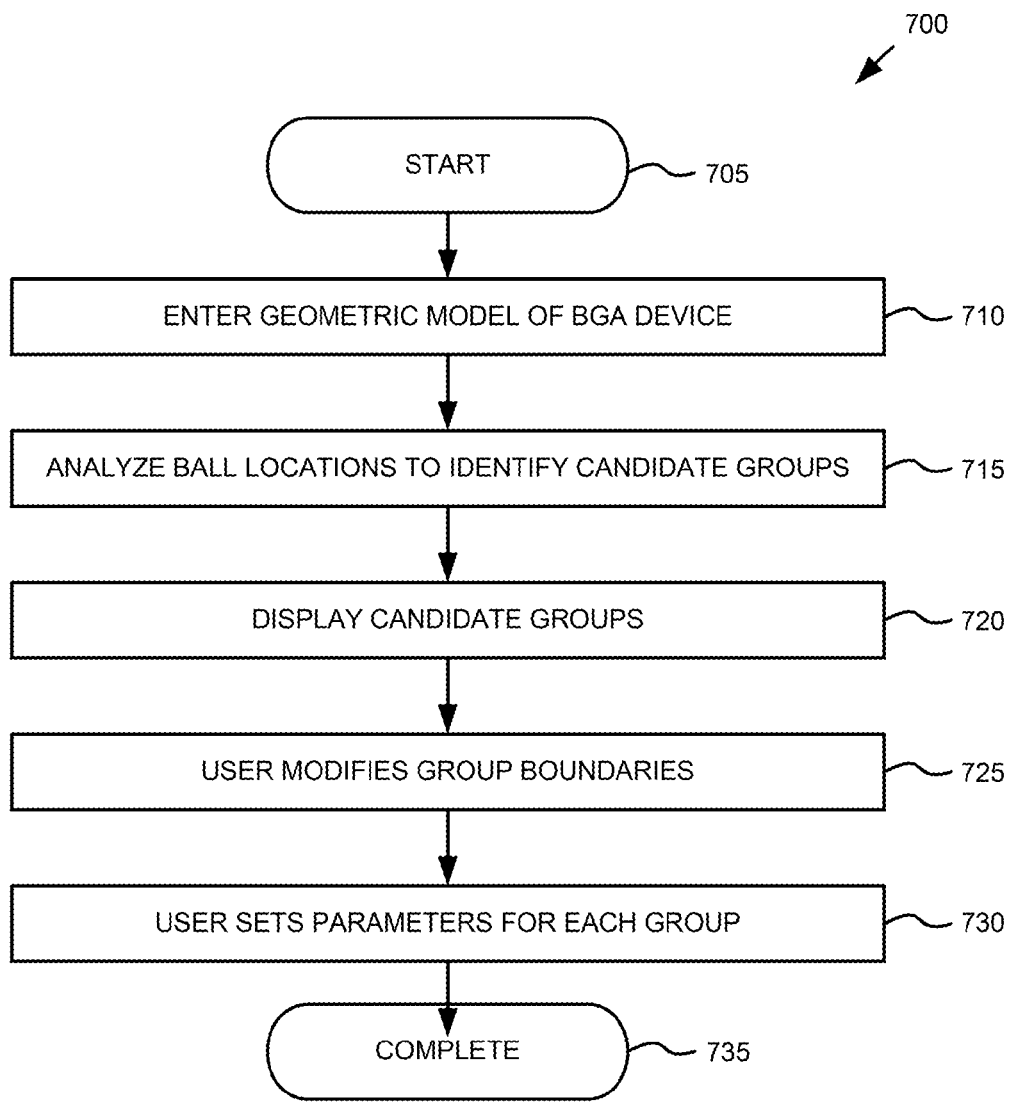
FIG. 7 is a flow chart detailing the steps of a procedure for generating exemplary candidate solder ball groups in accordance with an illustrative embodiment of the present invention.

FIG. 7 is a flow chart detailing the steps of a procedure 700 for establishing candidate solder ball groups for inspection in accordance with an illustrative embodiment of the present invention. The procedure 700 begins in step 705 and continues to step 710 where a geometric model of a BGA device is entered into the illustrative machine vision system. Illustratively, this may be a CAD model of the BGA device to be inspected. This may be input, using conventional computer input techniques, into the machine vision system for analysis.

Figure 8:
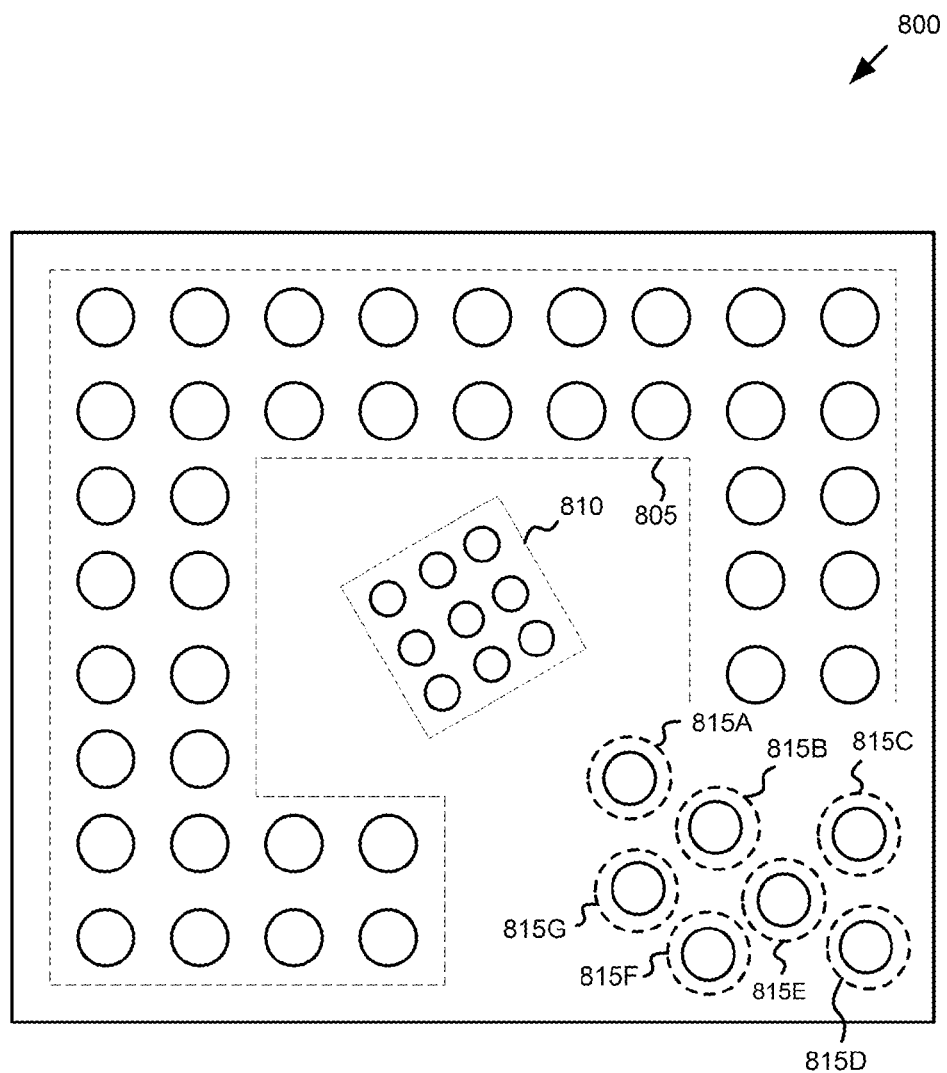
FIG. 8 is a schematic diagram illustrating an exemplary output of an analysis illustrating exemplary candidate solder ball groups in accordance with an illustrative embodiment of the present invention.

In response to the entry of the geometric model, the machine vision system, in step 715, analyzes ball locations to identify candidate solder ball groups within the BGA device. Illustratively, candidate solder ball groups are identified as those groupings of balls that share a common pattern. For example, a candidate solder ball group may comprise those solder balls having a same size, shape and grid alignment. This may be illustrated an exemplary FIG. 8 which is a schematic diagram of exemplary candidate solder ball groups in accordance with an illustrative embodiment of the present invention. For device 800, the machine vision system has illustratively identified a plurality of groups. A first group 805 consists of those balls having a first set pattern and size. A second group 810 consists of those balls having a second pattern and size. Individual groups 815 A-G are each associated with a single ball that has no recognizable pattern.

Figure 9:
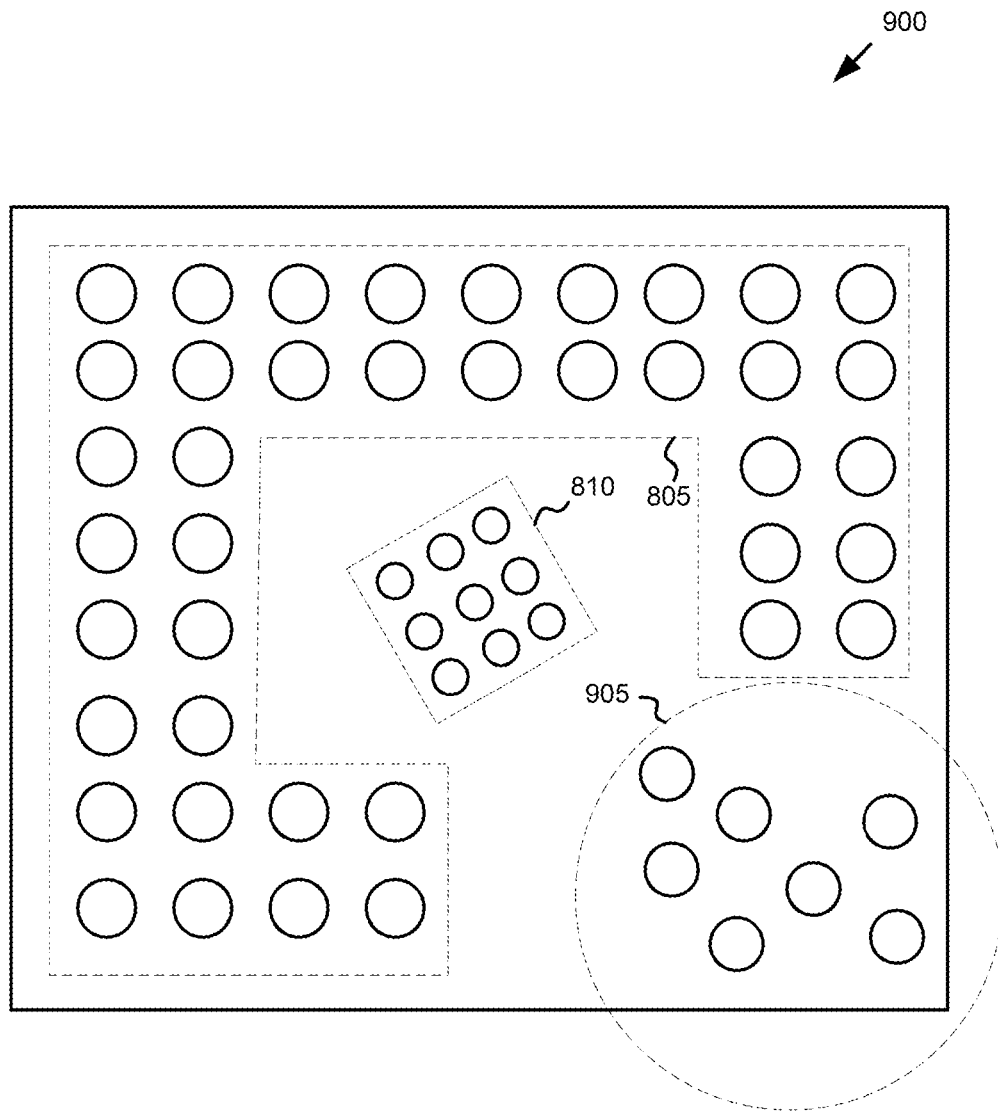
FIG. 9 is a schematic diagram illustrating exemplary solder ball groups after modification by a user in accordance with an illustrative embodiment of the present invention.

Once candidate solder ball groups have been identified in step 715, they are displayed, in step 720, to a user. A user may utilize a graphical user interface (GUI) and/or other form of a user interface to modify the candidate solder ball group boundaries in step 725. Illustratively, a user may accept a certain candidate groups but modify other groupings. For example, if a user desires all of the balls from the groups 815A-G to be in a single group, the user may modify the individual groups to a single group as shown in FIG. 9. FIG. 9 is a schematic diagram of an exemplary modified grouping of balls in accordance with an illustrative embodiment of the present invention.

Once the user has set the various group boundaries, the user may then set the various parameters for each group in step 730. The parameters may include, e.g., items to be inspected, thresholds associated with the various items, etc. The procedure then ends in step 735.

E. Alignment and Inspection

Figure 10:
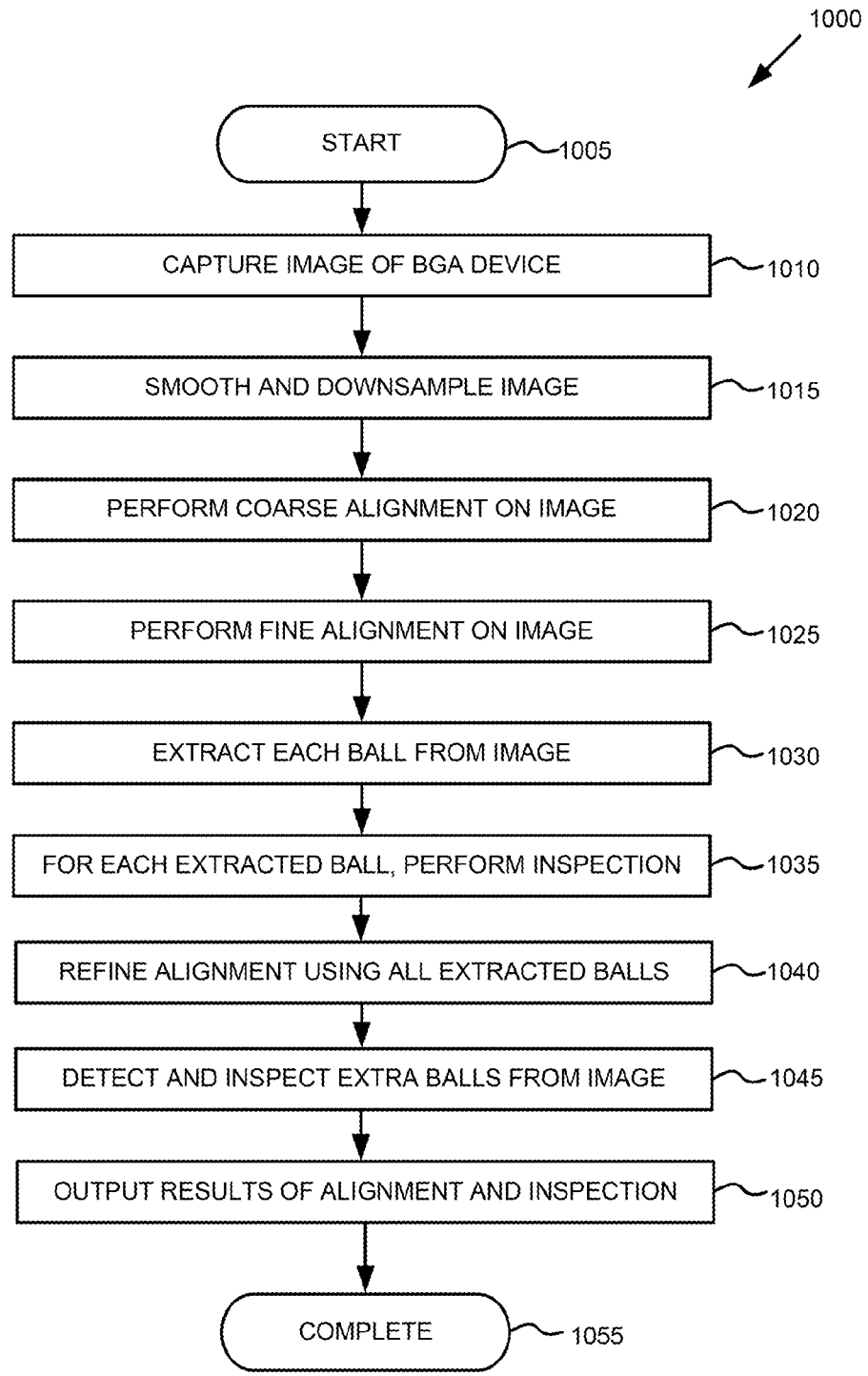
FIG. 10 is a flow chart detailing the steps of a procedure for performing runtime alignment and inspection of devices in accordance with an illustrative embodiment of the present invention.

FIG. 10 is a flowchart detailing the steps of a procedure 100 for high-speed alignment and inspection of devices during run time in accordance with an illustrative embodiment of the present invention. The procedure 1000 begins in step 1005 and continues to step 1010 where an image is captured of the device. Illustratively, the image is captured using the capturing device 105. The captured image is then smoothed and down sampled in step 1015. Illustratively, this smoothing and down sampling occurs using the parameter values defined during training time. In an illustrative embodiment of the present invention, smoothing and downsampling parameters are based on the median nearest-neighbor distance of the extracted blobs.

A coarse alignment is performed of the image in step 1020. A fine alignment of the image is then performed in step 1025. The coarse and fine alignment steps 1020, 1025 may be combined into a single alignment step in alternative embodiments of the present invention. The coarse and fine alignment steps 1020, 1025 are illustratively implemented using conventional machine vision techniques with only the alignment significant regions masked in. This enables the alignment techniques to operate at sufficient speed to meet production requirements and to provide the necessary degree of accuracy. It should be noted that in an illustrative embodiment of the present invention, the coarse alignment step 1020 is performed using a normalized correlation technique, while the fine alignment step 1025 utilizes an edgelet-based matching technique. As such, the description of the coarse and fine alignment steps using the same technique should be taken as exemplary only.

The machine vision system then utilizes this fine alignment information to extract each ball from the image in step 1030. For each extracted ball, the machine vision system then performs an inspection in step 1035. Illustratively, each ball is inspected individually. Each ball is inspected using the inspection items and thresholds set by the user for the appropriate group associated with the ball. Exemplary inspection items include, e.g., accurate ball position, position error, ball size and size errors, distance to neighbors, distance errors, intensity and/or contrast within an image, and metrics that score the overall appearance and shape of a ball.

Then, in step 1040, the alignment is refined using the known location of all of the extracted solder balls. By utilizing all extracted balls, a more accurate alignment is typically available than by only utilizing the alignment significant balls. Once all solder balls that are based on the alignment information have been extracted and inspected, those balls are then masked out of the image and a detection of any additional balls is performed in step 1045. These additional balls are also inspected as described above.

The results of the alignment and inspection are then output in step 1050. Procedure 1000 then completes in step 1055.

The foregoing description has been directed to particular embodiments of this invention. It will be apparent, however, that other variations and modifications may be made to the described embodiments, with the attainment of some or all of their advantages. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for generating an alignment mask for a ball grid array device, the method comprising:
    extracting one or more blobs from a geometric model of the ball grid array device;
    identifying one or more alignment significant blobs; and
    generating the alignment mask using the one or more alignment significant blobs.

2. The method of claim 1 further comprising training a machine vision system to operate utilizing the generated alignment mask.

3. The method of claim 1 wherein the alignment mask utilizes a plurality of different size masks to accommodate alignment significant blobs having varying sizes.

4. The method of claim 1 wherein the alignment mask utilizes polygonal masks to accommodate non-circular blobs.

5. The method of claim 1 wherein the generated alignment mask is utilized for a normalized correlation search.

6. The method of claim 1 wherein identifying alignment significant blobs further comprises identifying a set of blobs that have no neighboring blobs within a predefined threshold angle.

7. The method of claim 1 wherein the blobs are representative of solder balls that are non-uniformly aligned on the device.

8. A system for generating an alignment mask for a ball grid array device, the system comprising:
    a geometric model of the ball grid array device; and
    a processor configured to
        (i) extract a set of gray scale blobs from the geometric model of the ball grid array device;
        (ii) identify a set of alignment significant blobs from the set of extracted gray scale blobs; and
        generate the alignment mask using at least one of the set of alignment significant blobs.

9. A method for inspecting a ball grid array device, the method comprising:
    capturing an image of the device;
    performing an alignment operation on the captured image to generate alignment information;
    extracting at least one of a plurality of balls from the image using the alignment information; and
    for each extracted ball, performing an inspection using a set of parameters associated with one group of a plurality of groups.

10. The method of claim 9 further comprising:
    during a machine vision training time, assigning each ball of a geometric model of the device to one of the plurality of groups; and
    setting, for each of the plurality of groups, the set of parameters.

11. The method of claim 9 wherein the set of parameters comprises a list of inspection items.

12. The method of claim 9 wherein the set of parameters comprises a set of thresholds.

13. The method of claim 9 wherein at least one of the extract balls is non-circular.

14. The method of claim 9 wherein at least one of the extracted balls is of a first size and at least one of the extracted balls is of a second size.

15. The method of claim 9 wherein at least some of the extracted balls are not grid aligned.

16. The method of claim 9 further comprising using one or more of the inspected balls to refine the alignment information obtained by performing the alignment operation.

17. The method of claim 9 further comprising:
    detecting one or more additional balls not identified in a model of the device; and
    inspecting the one or more additional balls.

* * * * *